US006943469B2

(12) United States Patent
Nelson (10) Patent No.: US 6,943,469 B2
(45) Date of Patent: Sep. 13, 2005

(54) SUPPLEMENTED ZONAL VENTILATION SYSTEM FOR ELECTRIC GENERATOR

(75) Inventor: Robert John Nelson, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 180 days.

(21) Appl. No.: 10/285,857

(22) Filed: Nov. 1, 2002

(65) Prior Publication Data

US 2004/0084974 A1 May 6, 2004

(51) Int. Cl.⁷ .............................. H02K 9/02; H02K 9/04; H02K 9/06
(52) U.S. Cl. .............................. 310/55; 310/52; 310/58; 310/59; 310/60 R; 310/62; 310/63; 310/64
(58) Field of Search .............................. 310/52, 55, 58, 310/59, 60 R, 61, 64, 254, 62, 63

(56) References Cited

U.S. PATENT DOCUMENTS

| 1,499,696 A | * | 7/1924 | Rudenberg | 310/58 |
| 1,599,065 A | * | 9/1926 | Rudenberg | 310/58 |
| 1,751,424 A | * | 3/1930 | Rosenthal | 310/53 |
| 1,778,834 A | * | 10/1930 | Penney | 310/55 |
| 2,307,754 A | * | 1/1943 | Beckwith | 310/55 |
| 4,383,191 A | * | 5/1983 | Mizuyama et al. | 310/59 |
| 4,399,382 A | * | 8/1983 | Volkrodt | 310/216 |
| 4,467,229 A | * | 8/1984 | Ogita | 310/60 A |
| 6,552,452 B2 | * | 4/2003 | Ferguson | 310/61 |

FOREIGN PATENT DOCUMENTS

JP 411350918 A * 12/1999 ............ F01K/13/00

* cited by examiner

*Primary Examiner*—Thanh Lam
*Assistant Examiner*—David W. Scheuermann (57) ABSTRACT

An electrical generator (80) utilizes supplemental blowers or fans (140) to move additional cooling fluid through coolant flow paths (116, 124) in the generator, thus reducing the internal temperature of the generator. The supplemental blower comprises a blower (160) for supplementing cooling fluid flow through a discharge coolant flow path (155) and/or a supplemental blower (176, 178) for supplementing cooling fluid flow through an inlet coolant flow path (156). Either supplemental blower has the effect of lowering the peak internal generator temperature (134).

8 Claims, 6 Drawing Sheets

SUPPLEMENTED ZONAL VENTILATION SYSTEM FOR ELECTRIC GENERATOR

FIELD OF THE INVENTION

The present invention relates generally to an apparatus for removing heat from electrical generators, and more specifically to the use of external blowers or fans to improve heat removal from electrical generators.

BACKGROUND OF THE INVENTION

Figure 1:
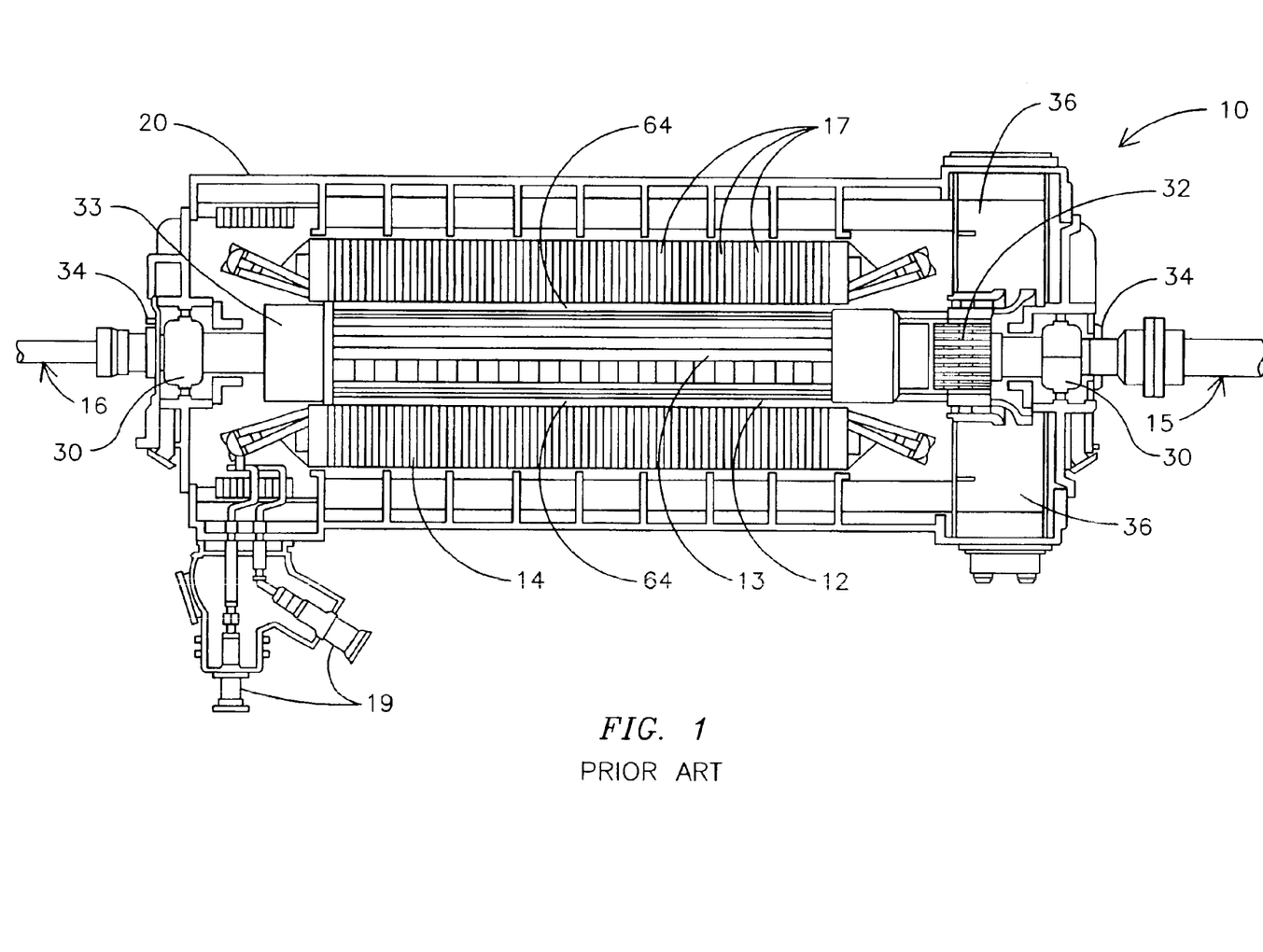
FIG. 1 is a cross-section view of a prior art electric generator.

As shown in FIG. 1, conventionally an electric generator 10 comprises a rotor 12 carrying axial field or rotor windings 13 producing a magnetic flux field that rotates within a stationary armature or stator 14. One end 15 of the rotor 12 is drivingly coupled to a steam or gas driven turbine (not shown in FIG. 1) for providing rotational energy to turn the rotor 12. The opposing end 16 is coupled to an exciter (not shown) for providing the direct current carried by the rotor windings 13.

The stator 14 comprises a core 17 including a plurality of thin, high-permeability circumferentially slotted laminations placed in a side-by-side orientation and insulated from each other to reduce eddy current losses. Stator coils 18 (see FIG. 3) are wound in the inwardly directed slots of the stator core 17. Alternating current is generated in the stator windings 18 by the action of the rotating magnetic filed emanating from the rotor windings 13. The current is carried to the main leads 19 for connection to an external electrical load.

The rotor 12 and the stator 14 are enclosed within a frame 20. Each rotor end comprises a bearing journal for mating with bearings 30 attached to the frame 20. The rotor 12 further carries a blower 32 for forcing cooling fluid through the generator elements as described further below. The cooling fluid is retained within the generator 10 by seals 34 located where the rotor ends penetrate the frame 20. The generator 10 further comprises coolers 36 through which the cooling fluid passes to release the heat absorbed from the generator components, after which the cooling fluid is recirculated through the generator elements.

Figure 2:
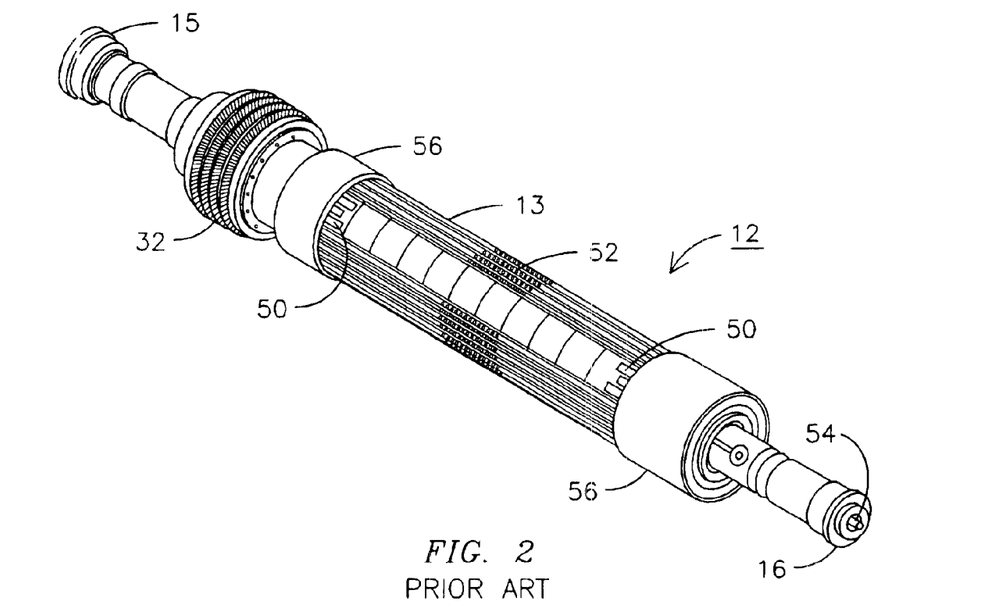
FIG. 2 is a pictorial illustration of a rotor of the electric generator of FIG. 1.

FIG. 2 further illustrates the elements of the rotor 12, including ventilation slots 50 on opposing ends of the rotor 12 and ventilation ports 52 located near the rotor center. As will be described further below, cooling fluid passes through the ventilation slots 50 and the ventilation ports 52 for cooling the rotor 12. The direct current generated by the exciter is coupled to the rotor windings through axial leads 54. The coil ends are held in place by retaining rings 56.

Figure 3:
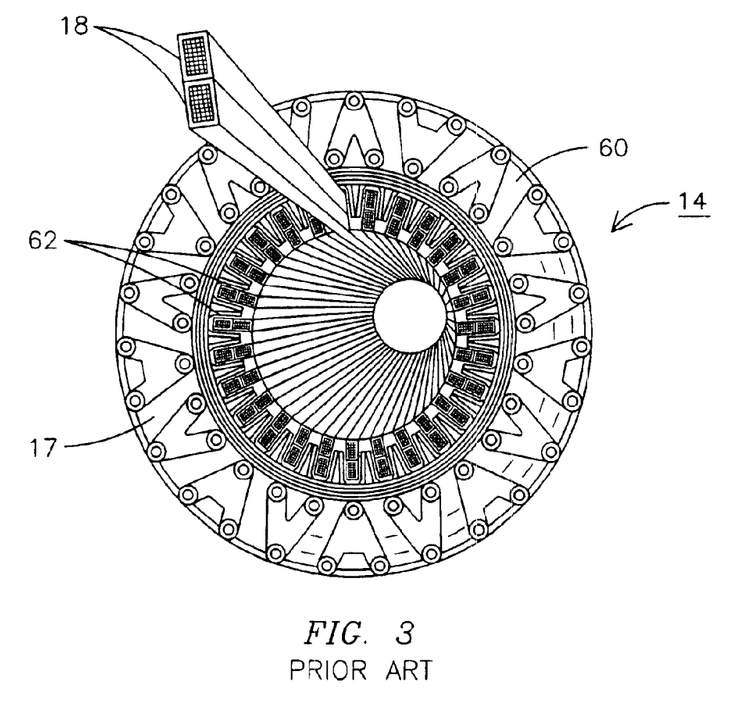
FIG. 3 is a pictorial cross-section illustration of a stator of the electric generator of FIG. 1.

FIG. 3 is a cross-sectional view of the stator 14, illustrating the various components described herein, including a face 60 of one lamination of the stator core 17 and the inwardly directed slots 62 carrying the stator coils 18. A somewhat distorted perspective view of the center region of stator 14 is provided to illustrate stator coils 18 and slots 62 extending along the axial length of stator 14.

Generator cooling is required to remove the heat energy produced by electrical losses resulting from the large currents flowing through the generator conductors, including the direct current flowing through the rotor windings 13, and the alternating current induced in the stator coils 18. Mechanical losses such as windage caused by the spinning rotor 12 and friction at the bearings 30 are also heat sources.

As generator electrical output ratings increase, additional heat is generated within the generator and must be removed through the use of more effective cooling systems. Generally, as the heat removal requirements increase, the basic premise of the cooling system operation progresses from air cooling, to hydrogen cooling, to hydrogen inner cooling, and finally, to cooling the stator with flowing water. Certain of these cooling techniques can also be used in combination, and there are multiple variations for each cooling system. Each cooling system type is described briefly below.

Air-cooled generators can be configured as either open or closed. Open air-cooled generators use outside air. The air passes through the generator components only once, after which it is exhausted back outside the generator. Closed air-cooled cooling systems include a heat exchanger, also referred to as a cooler, for cooling the heated airflow after it has passed through the generator. The cooled air is then recirculated back through the generator. Cold water is pumped through tubes of the heat exchanger over which the hot air passes, transferring heat from the air to the water.

Although air can be used as the cooling fluid, hydrogen is preferred as it possess excellent thermodynamic and heat transport properties, is lighter than air, and is 10 to 20 times more efficient as a cooling medium than air. One important negative aspect of hydrogen cooling is the explosive mixture formed by hydrogen and air over a wide range of hydrogen concentrations. Therefore, the seals 34 are provided at the boundaries of the generator frame 20 to prevent hydrogen leakage.

Hydrogen cooled generators are subdivided into two groups, conventional-cooled and inner-cooled. In the conventional system, the hydrogen flow removes excess heat energy from the rotor 12 and stator 14 by circulating hydrogen around and through coolant paths within and proximate the generator components, including especially the rotor 12 and the stator 14. The blower 32 creates high and low pressure zones within the generator, establishing hydrogen gas flow paths from high-pressure zones to low-pressure zones to remove heat from the generator components.

To provide rotor cooling, the hydrogen is directed through channels (not shown) in the hollow rotor windings, entering at the ventilation slots 50 at both rotor ends and exiting into a rotor/stator gap 64 (see FIG. 1) via the ventilation vents 52 in a mid-region of the rotor 12. The flow continues in the gap 64 as the hydrogen flows back to hydrogen coolers 36.

Cooling hydrogen is also directed through the stator core 16 in both the radial and the axial directions. In radially cooled generators, the blower 32 causes hydrogen to flow axially along the outside of the stator 14 then radially inwardly toward the gap 64 (due to the lower pressure within the gap 64) through openings or vents between certain of the stator core laminations. The hydrogen in the gap 64 is directed back to the coolers 36 where the absorbed heat is removed, and the hydrogen is then recirculated back through the generator 10. In an axially cooled stator, the hydrogen flow is directed from the coolers 36 axially along the outside of the stator 14 to the opposite end of the stator 14 then through axial ducts in the stator core 16 back toward the coolers 36.

As mentioned, the heated hydrogen flow exiting from the stator 14 and rotor 12 is directed by the blower 32 through the hydrogen coolers 36 mounted at the turbine end of the generator frame 20. Within the coolers 36 the hydrogen is cooled as it passes over water filled tubes. The cooler hydrogen flow is recirculated to continue the heat removal process.

A hydrogen inner-cooled system includes cooling ducts in the form of hollow passages in the stator coils 18, in addition to the axial or radial stator cooling ducts in the stator core 16 as described above. As the hydrogen passes through the cooling ducts, heat is absorbed from the conductors of the stator coils 18.

In a water cooling system the rotor 12 and stator core 16 are cooled with hydrogen as described above, while the stator coils 18 are cooled by pumping water through hollow conductors forming the stator coils 18. The water is cooled by outboard heat exchangers and recirculates through the stator coils 18.

BRIEF SUMMARY OF THE INVENTION

An electric generator includes supplemental cooling devices to lower the temperature of the generator elements and in particular to lower hot spot temperatures within the stator core. The generator includes the conventional stator core carrying a plurality of stator coils. The rotating rotor windings are responsive to the externally applied current for generating current in the stator coils by magnetic induction. To cool the generator components, cooling fluid (typically air or hydrogen) is forced into the generator by primary blowers affixed to opposing ends of the rotating rotor. The blowers cause the cooling fluid to traverse one or more coolant flow paths proximate to one or more of the stator core, the plurality of stator coils, the rotor shaft and the plurality of rotor windings. A coolant outlet discharges the cooling fluid from the generator, or the cooling fluid is cooled, by passing through a cooling unit, and then recirculated through the generator. Supplemental discharge and inlet blowers proximate discharge and inlet zones within the stator core provide additional cooling fluid to lower the internal temperature of the generator.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Before describing in detail the particular external zone ventilation system for electric generators in accordance with the present invention, it should be observed that the present invention resides primarily in a novel combination of hardware elements related thereto. Accordingly, the hardware elements have been represented by conventional elements in the drawings, showing only those specific details that are pertinent to the present invention, so as not to obscure the disclosure with structural details that will be readily apparent to those skilled in the art having the benefit of the description herein.

Figure 4:
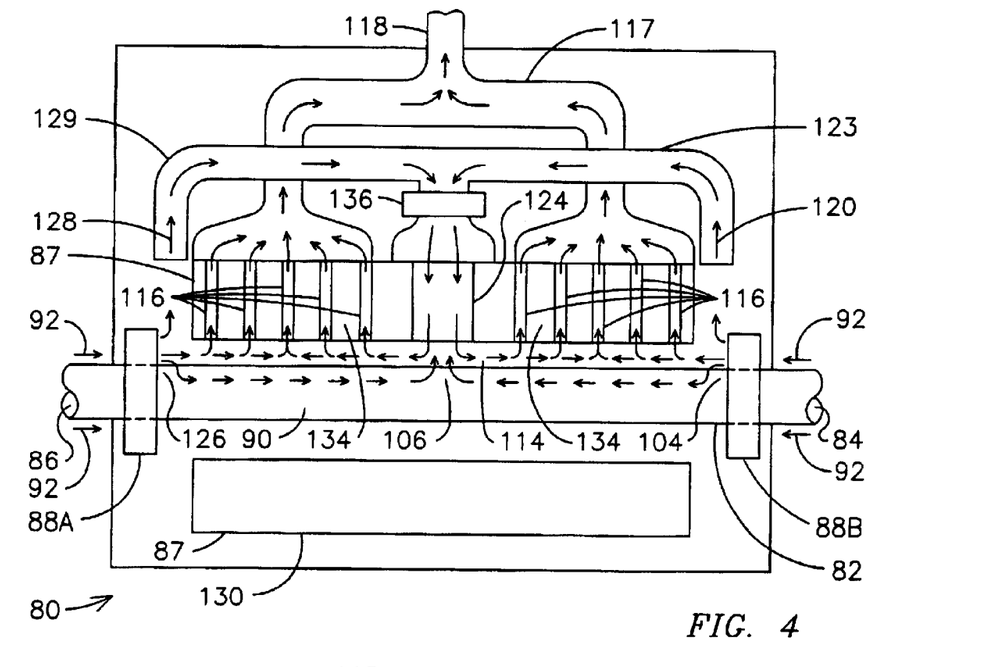
FIGS. 4 through 10 are schematic illustrations of generator cooling systems constructed according to the teachings of the present invention.

FIG. 4 illustrates, in schematic form, a generator 80 to which the teachings of the present invention can be applied.

The generator 80, referred to as an air-cooled generator, is cooled by filtered air drawn into the generator interior through filters and inlet silencers. According to the prior art, the air is exhausted from the generator 80 through exhaust silencers conventionally located at the top of the generator, or through coolers where the air is cooled for recirculation through the generator.

The generator 80 comprises a rotor 82, drivingly coupled to a turbine (not shown) at an end 84, and at an end 86 coupled to an exciter (not shown) for supplying direct current to the rotor windings. As described above, the rotating magnetic field creates a current flow in stator windings located within a stator core 87.

Blowers 88A and 88B, mounted for rotation on a rotor shaft 90, comprise a plurality of blades for circulating cooling air through the generator 80 as the rotor shaft 90 rotates. In one embodiment, the blowers 88A and 88B draw cool air into the generator 80 via inlet flow paths 92. In this embodiment, the cooling air is cooled below ambient by air-to-water coolers, for example, and drawn into the generator 80 via the inlet flow paths 92. In another embodiment, the heated air discharged from the generator 80 is circulated through coolers and recirculated back into the generator 80.

Rotation of the blowers 88A and 88B creates a plurality of pressure zones within the generator 80, which cause cooling air flow, as indicated by the arrowheads in FIG. 4. In one coolant flow path, cooling airflows from the blower 88B into a rotor end slot 104, through the hollow rotor windings, exiting the rotor 82 at rotor vents 106. In another coolant flow path airflows from the blower 88B axially through a rotor/stator gap 114 then radially outward through radial core vents 116 between laminations of the stator core 87. After passing through the radial core vents 116, the heated cooling fluid is collected by a duct 117 and discharged from the generator 80 via a discharge port 118. In one embodiment the heated air is exhausted to the atmosphere. In another embodiment the heated air passes through a cooler for recirculation back into the generator 80 via the inlet flow paths 92.

In a coolant flow path 120 the cooling air flows axially through a duct 123 and radially inward through an inlet vent 124 in the stator core 87. Once in the rotor/stator gap 114, the cooling air from the inlet vent 124 flows radially outward through the radial core vents 116 as indicated by the arrowheads in FIG. 4. Note the duct 123, and the other duct elements described below are incorporated within or external to the generator housing, i.e., the ducts are outside the electrically active elements of the generator 80.

The blower 88A creates similar coolant flow paths on the opposing end of the generator 80. In one coolant flow path, cooling air flows from the blower 88A into a rotor end slot 126, through the hollow rotor windings, exiting the rotor 82 at the rotor vents 106. In another coolant flow path air flows from the blower 88A axially through the rotor/stator gap 114 then radially outward through the radial core vents 116 between laminations of the stator core 87. In a coolant flow path 128 the cooling air flows axially within a duct 129 and radially inward through the inlet vent 124 in the stator core 87. Once in the rotor/stator gap 114, the cooling air flows radially outward through the radial core vents 116.

Similar cooling flow paths are created in a left segment 130 of the stator core 87. These cooling flow paths are not shown in FIG. 4. Also, it is recognized by those skilled in the art that the various cooling flow paths illustrated in FIG. 4 are not discrete and independent as might be suggested from the use of arrowheads to represent the cooling paths. There is considerable mixing and converging of the various cooling paths depending on the operational parameters and design of the generator 80. Thus the arrowheads are intended only to generally indicate the cooling flow paths.

In the description of the coolant flow paths presented above, the hottest stator areas, represented generally by reference characters 134, tend to be in a region between the inlet vent 124 and the opposing ends of the stator core 87. The coolant flowing in these regions has absorbed heat during traversal of the coolant paths 120 and 128, during flow through the inlet vent 124 and through the rotor/stator gap 114. Thus the coolant has a reduced capacity to substantially cool the stator core 87 in the areas 134. Since the generator current capacity is typically limited by the temperature of the hottest stator regions, it is desirable to lower the temperature of the areas 134, thus allowing an increase in the generator capacity.

According to the teachings of the present invention, the hot spot temperatures can be reduced by the placement of a supplemental external cooling blower 136 in the region of the inlet vent 124. A similar supplemental external cooling blower is located in the left segment 130 of the stator core 87. In one embodiment, the external cooling blower 136 comprises blades caused to rotate by the action of a motor to which electricity is supplied for imparting the rotational energy. External connotes that the blower 136 (and the other blowers described as "external" herein) is mounted within the ventilation ducts and is powered from a separate energy source, as compared with the blowers 88A and 88B, which are powered by rotation of the rotor shaft 90. The blower 136 can be provided as original equipment or added to the generator 80 after it has been placed in service if a capacity increase is required to supply the expected loads.

The blower 136 provides additional coolant flow through the inlet vent 124, which in turn lowers the temperature in the hottest regions 134 and allows an increase in the generator capacity. In one embodiment, the blower 136 supplies ambient cooling air or air cooled below ambient by a heat exchanger arrangement not shown in FIG. 4, to the inlet vent 124. In another embodiment, the blower 136 is not externally vented, but instead draws additional air into the inlet vent 124 from the coolant flow paths 120 and 128 to increase the cooling capacity of the coolant flow. Further, rather than a single blower 136 as shown in FIG. 4, one blower (not shown in FIG. 4) can be positioned in each of the ducts 123 and 129 to provide additional coolant flow through the inlet vent 124. These blowers can be externally vented and responsive to ambient or cooled air, or can draw additional air into the inlet vent 124 from the coolant paths 120 and 128.

In one embodiment, calculations showed that use of the blower 136 increased the generator capacity by about 5% to 15%. Note that the blower 136 is not required for normal operation of the generator 80 (thus it is referred to as a supplemental blower) and therefore can be placed in service only when additional generating capacity is required.

Figure 5:
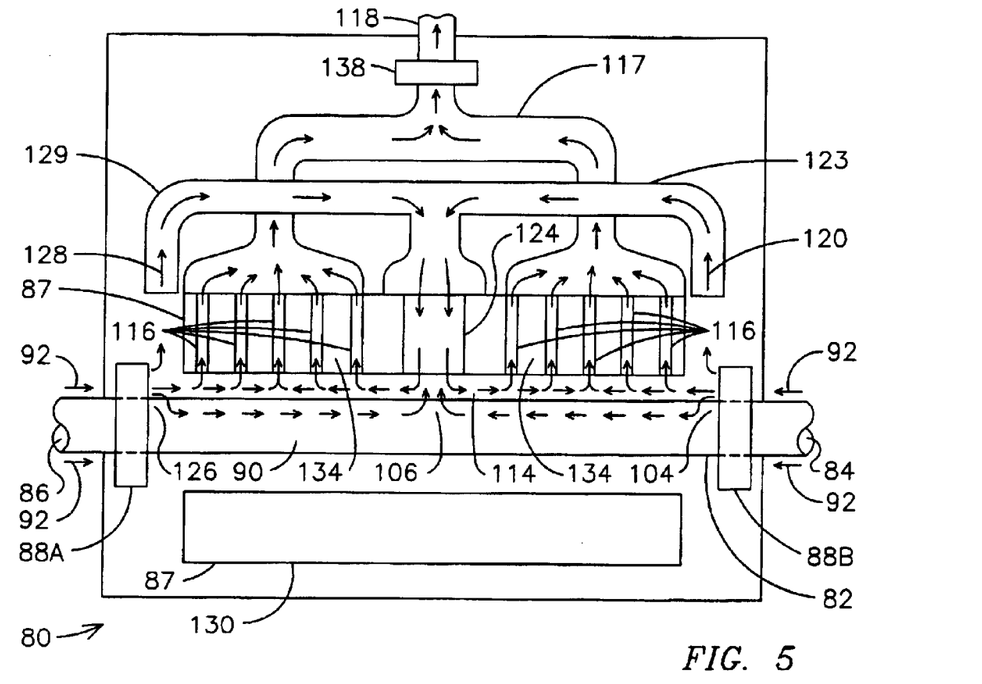

In another embodiment as shown in FIG. 5, a supplemental external motor-driven blower or fan 138 is positioned in the duct 117 that receives discharged coolant from the radial core vents 116. By increasing the coolant flow through the radial core vents 116, the temperature in the regions of the stator core 87 proximate the radial core vents 116 is reduced.

Figure 6:
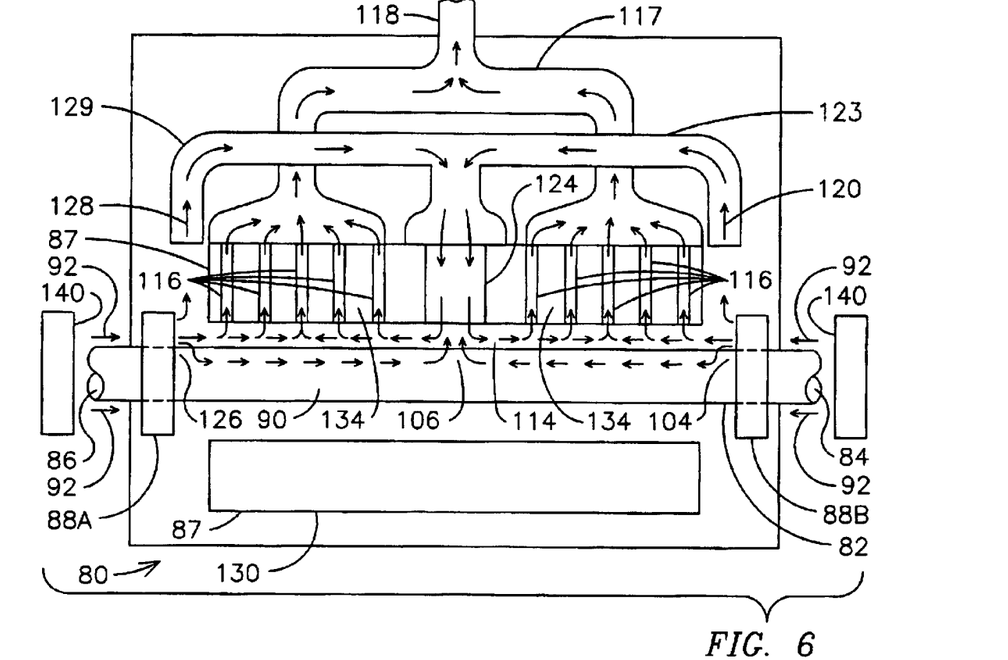

In another embodiment as shown in FIG. 6, the inlet flow paths 92 are supplemented with an external inlet blower 140 that operates in series with the blowers 88A and 88B, boosting the inlet air pressure to supply additional cooling air for the generator 80. By supplying additional coolant flow to the rotor 80 and the stator core 87, hot spot temperatures can be reduced and the operating range of the generator 80 increased.

The embodiments illustrated in FIGS. 4, 5 and 6 can be used in various combinations or singularly to reduce the temperature in various regions of the generator 80.

The generator cooling arrangement illustrated in FIGS. 4, 5 and 6 is referred to as three-zone cooling, i.e., two outlet or discharge zones through the radial core vents 116 on opposing sides of the stator core 87 and an inlet zone through the inlet vent 124. A five-zone cooling arrangement is illustrated by a generator 150 of FIG. 7 (and FIG. 8). In this cooling arrangement the stator core 87 comprises radial core discharge vents 154 and 155 carrying coolant in a radially outward flow through ducts 162, 168 and 170 as shown. Radial core inlet vents 156 carry coolant radially inward to the rotor/stator gap 114 from which the coolant is directed axially along the rotor 82 and radially outward through the radial core discharge vents 154 and 155.

Figure 7:
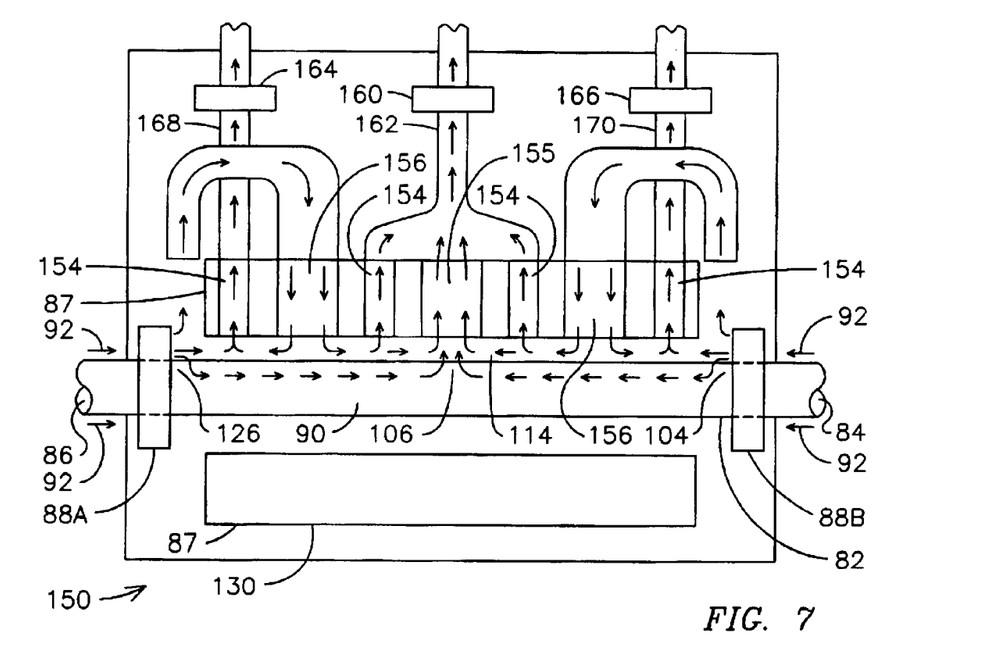

The cooling fluid discharged through the radial core discharge vent 155 tends to be the hottest of the cooling paths in the generator 150 because it has absorbed heat from the rotor 82, the rotor/stator gap 114 and the stator core 87. Also, due to the many divergent cooling paths within the generator 150, the coolant flow volume through the center is lower. As a result, a hot spot tends to develop in the area of the radial core discharge vent 155. Since the generator temperature, and especially the hot spot temperature, limits the allowable generator output due to the potential for overheating and possible component damage, it is desired to reduce the hot spot temperatures.

According to the teachings of the present invention, a supplemental external motor-driven fan or blower 160 is positioned in the duct 162 that receives cooling fluid from the radial core discharge vent 155 and adjacent radial core discharge vents 154, to draw more cooling air through this discharge region. As a result, the temperature in this region declines. Note that the blower 160 is not powered by rotation of the rotor shaft 90 and thus is referred to as a supplemental external blower. Typically, such a blower would be powered by a motor. Ducts 168 and 170 also discharge heated air from the generator 150.

The discharge from the blower 160 can be externally vented, or cooled using a heat exchanger, not shown in FIG. 7, for recirculation back through the generator 150. However, the blower 160 is not required for normal operation of the generator 150 and can therefore be used only when extra generating capacity is required.

In another embodiment, supplemental external motor-driven fans or blowers 164 and 166 can be positioned in either or both of the ducts 168 and 170. The radial core discharge vents at opposing ends of the stator core 87 that feed the ducts 168 and 170 tend to be the coolest zones of the generator 150 and thus the blowers 164 and 166 may not be required to lower the internal temperature. The embodiments with the blower 160 and the blowers 164 and 166 can be combined as required to lower the internal temperature of the generator 150.

Figure 8:
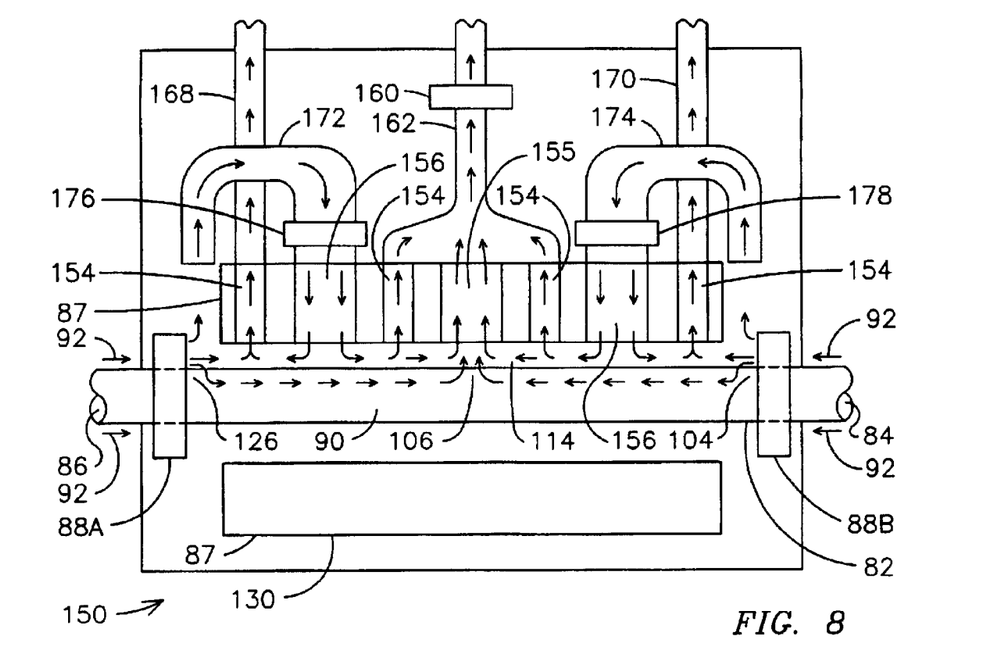

In yet another embodiment, see FIG. 8, ducts 172 and 174 providing cooling air to the radial core inlet vents 156, include supplemental external motor-driven fans or blowers 176 and 178, respectively. The blowers 176 and 178 can provide additional external ambient cooling air or external air cooled below ambient. Alternatively, the blowers 176 and 178 can accelerate the flow of cooling air through the radial core inlet vents 156.

In generators with multiple discharge and inlet zones, i.e., more than the three and five zones exemplified herein, according to the teachings of the present invention supplemental blowers and fans can be employed with one or more of the discharge zones and with one or more of the inlet zones to lower the generator hot spot temperatures.

Figure 9:
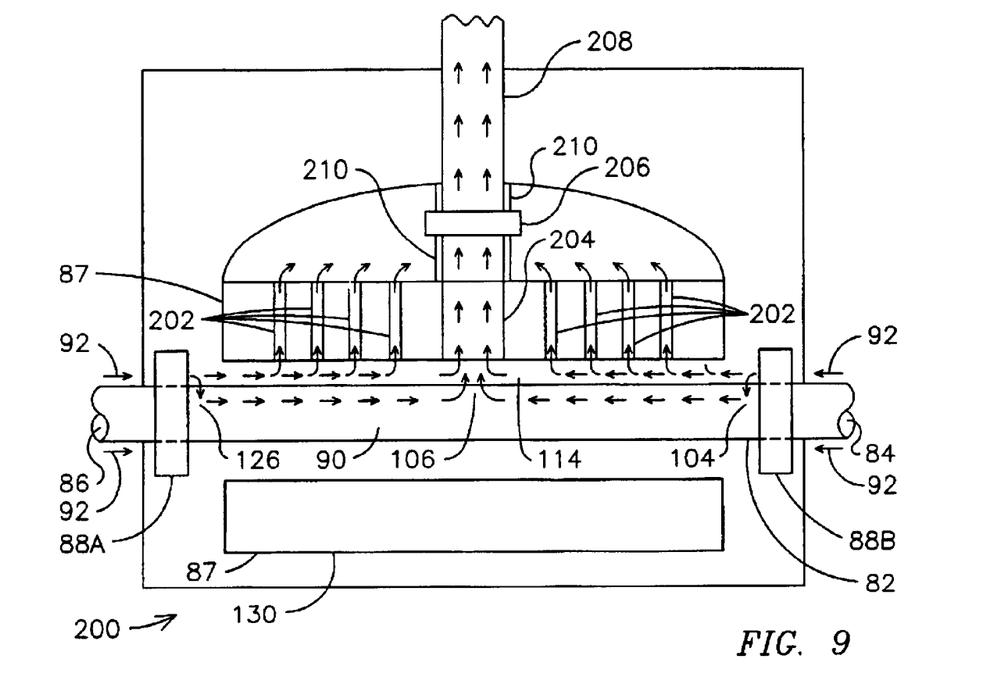

Application of the teachings of the present invention to a generator with a single discharge zone, commonly referred to as a single-zoned machine, is illustrated in FIG. 9. A generator 200 comprises radial core discharge vents 202 and a center radial core discharge vent 204. A supplemental external motor-driven fan or blower 206 is positioned within a duct 208 for drawing additional cooling air through the center radial core discharge vent 204. In one embodiment seals 210 are positioned to segregate the coolant flow from the center radial core discharge vent 204 (typically the hottest cooling fluid) from the radial core discharge vents 202. These two coolant flows would be separately vented. This embodiment is especially applicable to hydrogen-cooled generators.

Figure 10:
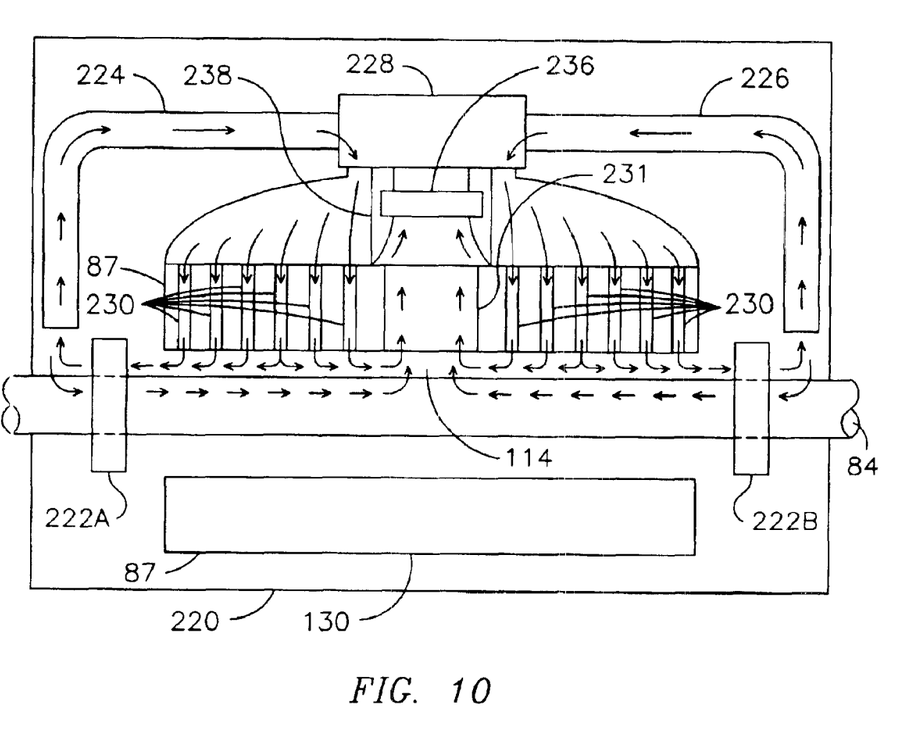

The teachings of the present invention can also be applied to reverse-ventilated machines, that is, where the cooling fluid is drawn from the machine ends rather than blown into the ends. Thus the coolant flows in a reverse-ventilated machine are reversed from the flows illustrated in the FIGS. 4 through 9. One example of a three-zone reverse ventilated generator 220 is illustrated in FIG. 10. Rotor-shaft mounted blowers 222A and 222B direct cooling fluid through ducts 224 and 226 to a cooler 228, where the coolant is cooled and directed through radial core inlet vents 230 in the stator core 87 to the rotor/stator gap 114. From there, a portion of the cooling fluid is directed to a radial core discharge vent 231. Another portion is directed to the blowers 222A and 222B and drawn back through the ducts 224 and 226. According to the teachings of the present invention, an external motor-driven fan or blower 236 is positioned within a duct 238 for receiving cooling fluid from the radial core discharge vent 231. Thus the blower 236 accelerates the flow of cooling fluid through duct 238 and reduces the stator core temperature in the region of the radial core discharge vent 231. A similar coolant flow arrangement and a supplemental external motor-driven fan or blower is positioned within the left segment 130 of the generator 220.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope thereof. For example, generators with any number of inlet and discharge zones can be accommodated by appropriate modifications to the teachings of the present invention. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for generating electricity in response to externally supplied rotational energy, the apparatus comprising:
   a stator core;
   a plurality of stator coils proximate the stator core;
   a rotor shaft responsive to the externally supplied rotational energy to rotate within the stator core;
   a plurality of rotor windings rotating with the rotor shaft and responsive to an electrical current, wherein rotation of the rotor windings generates an electrical current in the stator coils;
   a first coolant source for providing cooling fluid;
   a plurality of coolant flow paths proximate to one or more of the stator core, the plurality of stator coils, the rotor shaft and the plurality of rotor windings;
   one or more primary blowers connected to the rotating rotor and responsive to the cooling fluid for causing the cooling fluid to traverse one or more of the plurality of coolant flow paths; and
   a supplemental cooling blower proximate one or more of the plurality of coolant flow paths for moving the cooling fluid there through to supplement cooling provided by the one or more primary blowers through the plurality of coolant flow paths;
   wherein the apparatus has a center axis about which the rotor shaft rotates, wherein certain of the plurality of coolant flow paths comprise inlet coolant flow paths through the stator core through which the cooling fluid flows radially inward toward the center axis, and certain others of the plurality of coolant flow paths comprise discharge coolant flow paths through the stator core through which the cooling fluid flows radially outward away from the center axis, and wherein the supplemental blower is positioned proximate one or more of the inlet coolant flow paths for increasing the coolant flow there through; and
   the apparatus further comprising a second coolant source for providing cooling fluid, wherein the supplemental blower is responsive to the cooling fluid from the second coolant source for providing the cooling fluid from the second coolant source to one or more of inlet coolant flow paths.

2. The apparatus of claim 1 wherein the second coolant source is selected from among a coolant source providing fresh cooling fluid from a source external to the apparatus and a coolant source providing cooling fluid recirculated from the apparatus.

3. The apparatus of claim 2 wherein the cooling fluid is provided at ambient temperature.

4. The apparatus of claim 2 wherein the cooling fluid is cooled below ambient temperature.

5. An apparatus for generating electricity in response to externally supplied rotational energy, the apparatus comprising;
   a stator core;
   plurality of stator coils proximate the stator core;
   a rotor shaft responsive to the externally supplied rotational energy to rotate within the stator core;
   a plurality of rotor windings rotating with the rotor shalt and responsive to an electrical current, wherein rotation of the rotor windings generates an electrical current in the stator coils;
   a first coolant source for providing a cooling fluid;
   a plurality of coolant flow paths proximate to one or more of the stator core, the plurality of stator coil, the rotor shaft and the plurality of rotor winding;

one or more primary blower connected to the rotating rotor and responsive to the cooling fluid for causing the cooling fluid to traverse one or more of the plurality of coolant flow paths; and a supplemental cooling blower proximate one or more of the plurality of coolant flow paths for moving the cooling fluid there through to supplement cooling provided by the one or more primary blowers through the plurality of coolant flow paths; and the apparatus having a center axis about which the rotor shaft rotates, wherein the plurality of coolant flow paths comprise discharge coolant flow paths through the stator core through which the cooling fluid flows radially outward away from the center axis, and wherein the supplemental blower is positioned proximate certain ones of the plurality of discharge coolant flow paths for directing the cooling fluid there through.

6. The apparatus of claim 5 wherein the supplemental blower vents the cooling fluid from the apparatus.

7. An apparatus for generating electricity in response to externally supplied rotational energy, the apparatus comprising:

a stator;

a plurality of stator coils proximate the stator core;

a rotor shaft responsive to the externally supplied rotational energy and rotatable within the stator core;

a plurality of rotor windings rotation with the rotor shaft and responsive to an electrical current, wherein rotation of the rotor windings generates an electrical current in the stator coils;

a first coolant source for providing cooling fluid;

a plurality of coolant flow paths proximate to one or more of the stator core, the plurality of stator coils, the rotor shaft and the plurality of rotor windings;

one or more primary blowers connected to the rotor shaft and responsive to the cooling fluid for causing the cooling fluid to traverse one or more of the plurality of coolant flow paths;

a source of electricity;

a supplemental cooling blower in fluid communication with one or more of the primary blowers and responsive to the cooling fluid for drawing the cooling fluid into the apparatus, wherein the supplemental blower comprises blades and a motor receiving electricity from the source of electricity for imparting rotational energy to the blades; and two primary blowers wherein one primary blower is affixed to opposing ends of the rotor shaft, further comprising two supplemental blowers wherein one supplemental blower is positioned proximate each one of the primary blowers for operation in serial communication therewith.

8. An apparatus for generating electricity in response to externally rotational energy, apparatus comprising:

a stator core;

a plurality of stator coils proximate the stator core;

a rotor shaft responsive to the externally supplied rotational energy and rotatable within the stator core;

a plurality of rotor windings rotating with the rotor shaft and responsive to an electrical current, wherein rotation of the rotor windings generates an electrical current in the stator coils;

a heat exchanger responsive to cooling fluid for cooling the cooling fluid for recirculation within the apparatus;

one or more primary blowers, connected to the rotating rotor and responsive to the cooling fluid, wherein the one or more primary blowers cause the cooling fluid to traverse a plurality of coolant flow paths proximate to one or more of the stator core and the plurality of stator coils; and a supplemental cooling blower in fluid communication with one or more of the plurality of coolant flow paths for moving the cooling fluid there through into the heat exchanger to supplement cooling provided by the one or more primary blowers through the plurality of coolant flow paths; and the apparatus having a center axis about which the rotor shaft rotates, wherein certain of the plurality of coolant flow paths comprise inlet coolant flow paths through the stator core through which the cooling fluid flows radially inward toward the center axis, and wherein the inlet cooling flow paths are located at opposing ends of the stator core, wherein certain others of the plurality of coolant flow paths comprise discharge coolant flow paths through the stator core through which the cooling fluid flows radially outward away from the center axis, and wherein the discharge cooling flow paths are located in the middle region of the stator core, and wherein the supplemental blower is positioned proximate one or more of the discharge coolant flow paths for increasing the coolant flow there through.

* * * * *